(12) United States Patent
Broughton et al.

(10) Patent No.: US 8,896,507 B2
(45) Date of Patent: Nov. 25, 2014

(54) LIQUID CRYSTAL DEVICE

(75) Inventors: Benjamin John Broughton, Oxford (GB); Nathan James Smith, Oxford (GB); Allan Evans, Oxford (GB); Paul Antony Gass, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 1240 days.

(21) Appl. No.: 12/682,099

(22) PCT Filed: Sep. 26, 2008

(86) PCT No.: PCT/JP2008/067997
§ 371 (c)(1),
(2), (4) Date: Apr. 8, 2010

(87) PCT Pub. No.: WO2009/057417
PCT Pub. Date: May 7, 2009

(65) Prior Publication Data
US 2010/0220043 A1    Sep. 2, 2010

(30) Foreign Application Priority Data
Oct. 30, 2007 (GB) .................................. 0721255.8

(51) Int. Cl.
*G09G 3/34* (2006.01)
*G02F 1/1343* (2006.01)
*G02F 1/13* (2006.01)
*G02F 1/1337* (2006.01)
*G02F 1/139* (2006.01)

(52) U.S. Cl.
CPC .................. *G02F 1/134309* (2013.01); *G02F 2001/133776* (2013.01); *G02F 1/133707* (2013.01); *G02F 2001/134381* (2013.01); *G02F 1/1323* (2013.01); *G02F 1/1393* (2013.01)
USPC ............................................ 345/84; 349/130

(58) Field of Classification Search
USPC ............................................................ 345/84
See application file for complete search history.

(56) References Cited

U.S. PATENT DOCUMENTS

RE27,617 E    4/1973    Olsen
4,764,410 A    8/1988    Grzywinski
(Continued)

FOREIGN PATENT DOCUMENTS

GB    2 404 991 A    2/2005
GB    2 405 544 A    3/2005
(Continued)

OTHER PUBLICATIONS

International Search Report for corresponding Application No. PCT/JP2008/067997 mailed Jan. 6, 2009.
(Continued)

*Primary Examiner* — Amare Mengistu
*Assistant Examiner* — Sarvesh J Nadkarni
(74) *Attorney, Agent, or Firm* — Renner, Otto, Boisselle & Sklar, LLP

(57) ABSTRACT

A liquid crystal device comprises an active matrix substrate (6) and a counter-substrate (7) provided with homeotropic alignment surfaces (11). A layer of nematic liquid crystal material is provided between the alignment surfaces (11) so as to form a vertically aligned nematic device. The substrates (6, 7) carry a pixel electrode arrangement and a counter-electrode arrangement which define a plurality of pixel regions. Each of least some of these regions has a pixel electrode (13), which may be split into two halves, and a counter-electrode (8) which are arranged to apply an electric field for controlling the liquid crystal director (12) out-of-plane tilt angle. A further electrode (14), for example in the form of a plurality of parallel fingers, cooperates with at least one of the other electrodes (8, 13) to apply a second electric field for controlling the director in-plane azimuth angle. Such a device may be used, for example, as a switchable public/private display.

33 Claims, 11 Drawing Sheets

(56) References Cited

U.S. PATENT DOCUMENTS

| | | | |
|---|---|---|---|
| 4,766,023 | A | 8/1988 | Lu |
| 5,147,716 | A | 9/1992 | Bellus |
| 5,528,319 | A | 6/1996 | Austin |
| 5,608,556 | A | 3/1997 | Koma |
| 5,825,436 | A | 10/1998 | Knight |
| 5,831,698 | A | 11/1998 | Depp et al. |
| 5,844,640 | A | 12/1998 | Adachi |
| 5,877,829 | A | 3/1999 | Okamoto et al. |
| 6,104,450 | A | 8/2000 | Hiraishi |
| 6,211,930 | B1 | 4/2001 | Sautter et al. |
| 6,335,771 | B1 | 1/2002 | Hiraishi |
| 6,469,765 | B1 | 10/2002 | Matsuyama et al. |
| 6,646,707 | B2 | 11/2003 | Noh et al. |
| 6,781,657 | B1 | 8/2004 | Kim et al. |
| 2001/0015782 | A1 | 8/2001 | Takato et al. |
| 2002/0158967 | A1 | 10/2002 | Janick et al. |
| 2002/0180922 | A1 | 12/2002 | Takato et al. |
| 2004/0100604 | A1 | 5/2004 | Takato et al. |
| 2004/0207594 | A1 | 10/2004 | Kubo |
| 2004/0233368 | A1 | 11/2004 | Kim et al. |
| 2005/0024548 | A1 | 2/2005 | Choi et al. |
| 2005/0190329 | A1 | 9/2005 | Okumura |
| 2006/0109224 | A1 | 5/2006 | Chang et al. |
| 2006/0267905 | A1* | 11/2006 | Nishino et al. .......... 345/98 |
| 2007/0040780 | A1* | 2/2007 | Gass et al. .......... 345/87 |
| 2007/0040975 | A1 | 2/2007 | Momoi |
| 2007/0046881 | A1 | 3/2007 | Takei |
| 2007/0057892 | A1 | 3/2007 | Shin et al. |
| 2007/0121047 | A1 | 5/2007 | Chung et al. |
| 2007/0188690 | A1 | 8/2007 | Ochiai et al. |
| 2011/0012924 | A1 | 1/2011 | Gass et al. |
| 2011/0211137 | A1 | 9/2011 | Kim et al. |

FOREIGN PATENT DOCUMENTS

| | | |
|---|---|---|
| GB | 2 410 116 A | 7/2005 |
| GB | 2 413 394 A | 10/2005 |
| GB | 2 418 518 A | 3/2006 |
| GB | 2 421 346 A | 6/2006 |
| GB | 2 428 128 A | 1/2007 |
| GB | 2 428 152 A | 1/2007 |
| GB | 2 439 961 A | 1/2008 |
| JP | 7-199190 A | 8/1995 |
| JP | 9-230377 A | 9/1997 |
| JP | 10-142577 A | 5/1998 |
| JP | 11-024068 A | 1/1999 |
| JP | 11-30783 A | 2/1999 |
| JP | 2000-356786 A | 12/2000 |
| JP | 2004-272259 A | 9/2004 |
| JP | 3607272 B2 | 10/2004 |
| JP | 2006-523850 A | 10/2006 |
| JP | 2006-323280 | 11/2006 |
| JP | 2007-017988 A | 1/2007 |
| JP | 2007-079582 A | 3/2007 |
| JP | 2007-212872 A | 8/2007 |
| WO | 2006/132384 A1 | 12/2006 |

OTHER PUBLICATIONS

Form PCT/ISA/237 for corresponding Application No. PCT/JP2008/067997 dated Jan. 6, 2009.
Search Report for corresponding UK Application No. GB 0721255.8 dated Feb. 26, 2008.
Adachi, "P-228L: Late-News Poster: Controllable Viewing-Angle Displays using a Hybrid Aligned Nematic Liquid Crystal Cell", SID 06 Digest, pp. 705-708.
Lim et al., "P-148: Viewing Angle Switching in Vertical Alignment Liquid Crystal Display by Optimizing Pixel Structure and Controlling LC Orientation", SID 07 Digest, pp. 756-759.
Jin et al., "P-139: Novel Viewing-Angle Controllable TFT-LCD", SID 06 Digest, pp. 729-731.
Rocket Software, Inc., http://www.rocketsoftware.com.
Yamada et al., "Fast Response and Wide-Viewing Angle Technologies for LC-TV Application", IDW 02 Digest, pp. 203-206.
Takeda et al., "41.1: A Super-High Image Quality Multi-Domain Vertical Alignment LCD by New Rubbing-Less Technology", SID '98 Digest, pp. 1077.
Kim et al., "18.1: Distinguished Paper: Novel TFT-LCD Technology for Motion Blur Reduction Using 120Hz Driving with McFi", SID 07 Digest, pp. 1003-1006.
You et al., "61.3: A Novel Driving Method Using 2-Dimension Spatial Averaging for High Speed Driving of AMLCD", SID 07 Digest, pp. 1725-1728.
Kim, "15.4: Invited Paper: Super PVA Sets New State-of-the-Art for LCD-TV", SID 04 Digest, pp. 760-763.
Hanaoka et al., "40.1: A New MVA-LCD by Polymer Sustained Alignment Technology", SID 04 Digest, pp. 1200-1203.
Adachi, "P-228L: Late-News Poster: Controllable Viewing-Angle Displays using a Hybrid Aligned Nematic Liquid Crystal Cell", SID 06 Digest, pp. 705-708, 2006.
Lim et al., "P-148: Viewing Angle Switching in Vertical Alignment Liquid Crystal Display by Optimizing Pixel Structure and Controlling LC Orientation", SID 07 Digest, pp. 756-759, 2007.
Jin et al., "P-139: Novel Viewing-Angle Controllable TFT-LCD", SID 06 Digest, pp. 729-731, 2006.
Rocket Software, Inc., http://www.rocketsoftware.com, 2010.
Yamada et al., "Fast Response and Wide-Viewing Angle Technologies for LC-TV Application", IDW 02 Digest, pp. 203-206, 2002.
Takeda et al., "41.1: A Super-High Image Quality Multi-Domain Vertical Alignment LCD by New Rubbing-Less Technology", SID '98 Digest, pp. 1077, 1998.
Kim et al., "18.1: Distinguished Paper: Novel TFT-LCD Technology for Motion Blur Reduction Using 120Hz Driving with McFi", SID 07 Digest, pp. 1003-1006, 2007.
You et al., "61.3: A Novel Driving Method Using 2-Dimension Spatial Averaging for High Speed Driving of AMLCD", SID 07 Digest, pp. 1725-1728, 2007.
Kim, "15.4: Invited Paper: Super PVA Sets New State-of-the-Art for LCD-TV", SID 04 Digest, pp. 760-763, 2004.
Hanaoka et al., "40.1: A New MVA-LCD by Polymer Sustained Alignment Technology", SID 04 Digest, pp. 1200-1203, 2004.

* cited by examiner

LIQUID CRYSTAL DEVICE

TECHNICAL FIELD

The present invention relates to a liquid crystal (LC) device. Examples of such a device may have public and private viewing modes. In typical examples of such a device used as a display, a single LC layer is used to display an image, the same LC layer being switchable between two states, one of which provides a wide range of viewing angles for said image, the other providing a restricted range of angles from which the displayed image can be observed.

The term "LCD" is used herein to mean a liquid crystal device or a liquid crystal display according to the context.

BACKGROUND ART

Electronic display devices, such as monitors used with computers and screens built in to telephones and portable information devices, are usually designed to have a viewing angle as wide as possible, so that they can be read from any viewing position. However, there are some situations where a display that is visible from only a narrow range of angles is useful. For example, one might wish to read a private document using a portable computer while on a crowded train.

Several methods exist for adding a light controlling apparatus to a naturally wide-viewing range display.

One such structure for controlling the direction of light is a 'louvred' film. The film consists of alternating transparent and opaque layers in an arrangement similar to a Venetian blind. Like a Venetian blind, it allows light to pass through it when the light is travelling in a direction parallel or nearly parallel to the layers, but absorbs light travelling at large angles to the plane of the layers. These layers may be perpendicular to the surface of the film or at some other angle. Methods for the production of such films are described in a USRE27617 (F. O. Olsen; 3M 1973), U.S. Pat. No. 4,766,023 (S.-L. Lu, 3M 1988), and U.S. Pat. No. 4,764,410 (R. F. Grzywinski; 3M 1988).

Other methods exist for making films with similar properties to the louvred film. These are described, for example, in U.S. Pat. No. 5,147,716 (P. A. Bellus; 3M 1992), and U.S. Pat. No. 5,528,319 (R. R. Austin; Photran Corp. 1996)

Louvred films may be placed either in front of a display panel or between a transmissive display and its backlight to restrict the range of angles from which the display can be viewed. In other words, they make a display "private".

The principal limitation of such films is that they require mechanical manipulation, i.e. removal of the film, to change the display between the public and private viewing modes.

US 2002/0158967 (J. M. Janick; IBM, published 2002) shows how a light control film can be mounted on a display so that the light control film can be moved over the front of the display to give a private mode, or mechanically retracted into a holder behind or beside the display to give a public mode. This method has the disadvantages that it contains moving parts which may fail or be damaged and that it adds bulk to the display.

A method for switching from public to private mode with no moving parts is to mount a light control film behind the display panel and to place a diffuser which can be electronically switched on and off between the light control film and the panel. When the diffuser is inactive, the light control film restricts the range of viewing angles and the display is in private mode. When the diffuser is switched on, it causes light travelling at a wide range of angles to pass through the panel and the display is in public mode. It is also possible to mount the light control film in front of the panel and place the switchable diffuser in front of the light control film to achieve the same effect.

Switchable privacy devices of these types are described in U.S. Pat. No. 5,831,698 (S. W. Depp; IBM 1998), U.S. Pat. No. 6,211,930 (W. Sautter; NCR Corp. 2001) and U.S. Pat. No. 5,877,829 (M. Okamoto; Sharp K. K. 2001). They share the disadvantage that the light control film always absorbs a significant fraction of the light incident upon it, whether the display is in public or private mode. The display is therefore inefficient in its use of light. Since the diffuser spreads light through a wide range of angles in the public mode, these displays are also dimmer in public mode than in private mode, unless the backlight is made brighter to compensate.

Another disadvantage relates to the power consumption of these devices. In the public mode of operation, the diffuser is switched on so as to be optically diffusing. This often means that voltage is applied to a switchable polymer-dispersed liquid crystal diffuser. More power is therefore consumed in the public mode than in the private mode. This is a disadvantage for displays which are used for most of the time in the public mode.

Another known method for making a switchable public/private display is given in U.S. Pat. No. 5,825,436 (K. R. Knight; NCR Corp. 1998). The light control device is similar in structure to the louvred film described earlier. However, each opaque element in the louvred film is replaced by a liquid crystal cell which can be electronically switched from an opaque state to a transparent state. The light control device is placed in front of or behind a display panel. When the cells are opaque, the display is in its private mode; when the cells are transparent, the display is in its public mode.

The first disadvantage of this method is in the difficulty and expense of manufacturing liquid crystal cells with an appropriate shape. A second disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

The concept of using a hologram to provide a privacy function is disclosed in GB2404991 but such a display suffers from two disadvantages. First, due to unwanted diffraction of light from the display by the hologram, the colour of the image seen by viewers is incorrect. Second, for applications using a touch screen mounted on the front of the display, the user's hand can block the illumination of the hologram and so reduce the effectiveness of the privacy. GB 2428128 discloses solutions to these problems.

In GB2410116, a display is switched from public to private mode by using two different backlights which generate light with different angular ranges.

GB2405544 (Sharp) describes switchable privacy devices based on louvres, which operate only for one polarisation of light. The louvres are switched on and off either by rotating dyed liquid crystal molecules in the louvre itself or by rotating the plane of polarisation of the incident light using a separate element.

In GB2421346 (Sharp), a polarisation modifying layer (PML) is placed behind the exit polariser of a liquid crystal display panel. Some parts of the PML are simply transparent. Other parts change the polarisation of light passing through them so that pixels viewed through these parts are inverted in colour (bright pixels becoming dark and dark pixels becoming bright). Data sent to pixels directly behind these parts is inverted so that, when the display is viewed from a central position, the image appears normally. However, when the display is viewed from a different angle, different pixels are viewed through the retarder elements and the image is corrupted. Off-axis viewers see a confusing image which is a random dot pattern. The PML may be made from liquid crystal and switched off to give a public mode.

Another method for making a switchable public/private display device is disclosed in JP3607272 (Toshiba 2005). This device uses an additional liquid crystal panel, which has patterned liquid crystal alignment. Different aligned segments of the panel modify the viewing characteristics of different areas of the display in different ways, with the result that the whole display panel is fully readable only from a central position.

In GB2413394 (Sharp), a switchable privacy device is constructed by adding one or more extra liquid crystal layers and polarisers to a display panel. The intrinsic viewing angle dependence of these extra elements can be changed by switching the liquid crystal electrically in the well-known way.

GB2418518 adds a guest host (dyed) LC layer with a patterned electrode to a standard thin film transistor (TFT) LC display. The dyed LC layer can be switched between an absorbing (private) and non-absorbing (public) state. The dye molecule absorption is dependent upon the incident angle and polarisation of light. For a given polarisation and orientation, the absorption of the dye increases with larger viewing angles resulting in low brightness at high angles (narrow mode).

WO06132384A1 (Sharp, 2005) discloses the use of an extra liquid crystal layer located between the existing polarisers of a liquid crystal display (LCD) panel. In this location, the extra switch cell can modify the greyscale curves for off-axis light. This provides a higher level of privacy for images than the techniques disclosed in GB2413394.

GB 2439961 discloses the use of a switchable privacy device constructed by adding an extra cholesteric layer and circular polarisers to a display panel. The cholesteric layer can be switched between a public (wide view) mode and a private (narrow view) mode that can provide 360° azimuthal privacy.

Adachi et al (SID 06, pp. 228) and Okumura (US20050190329) disclose the use of a hybrid aligned nematic (HAN) cell to provide a switchable privacy function. The HAN cells used by Adachi and Okumura are used in conjunction with an underlying image panel.

The above methods all suffer the disadvantage that they require the addition of extra apparatus to the display to provide the functionality of electrically switching the viewing angle range. This adds cost and particularly bulk to the display, which is very undesirable, particularly in mobile display applications such as mobile phones and laptop computers.

JP09230377 and U.S. Pat. No. 5,844,640 (Sharp, 1996) describe a method of changing the viewing angle properties of a single layer LCD panel. This is achieved for a Vertically Aligned Nematic (VAN) LC mode. Electric fields in the plane of the display panel are used to control how the LC material tilts in a pixel area. The number and orientation of different tilt domains within a pixel can be controlled by the in-plane fields. A pixel with several tilt domains will have a wide viewing angle; a pixel with one tilt domain will have a narrower viewing angle. The use of this method to vary the viewing angle of a display is described. However, the viewing angle of a single tilt domain of the VAN mode described is not sufficiently narrow to provide good privacy.

US20070040975A1 (LG Philips, 2005) discloses the design of an LCD panel in which the LC alignment is different in different sub-pixel regions of the display. This allows some sub-pixel regions to display an image to a wide viewing region, while the other sub-pixel regions allow light transmission only to the side viewing directions. These second types of sub-pixels are then used to reduce the overall contrast of the image being shown to the side viewer by the first type of sub-pixel, thereby obscuring the image information. A similar method to this, in which angled gaps in the pixel electrode, rather than differing LC alignment, are used to determine the azimuthal orientation of the LC director in different regions of the display, is published in SID '07 Digest pp 756-759.

A similar method is disclosed in US20070121047A1 (LG Philips, 2005) and associated paper SID '06 digest pp 729-731. In these schemes, the LC is uniformly aligned across the whole display panel, but some sub-pixel regions have an in-plane field applied to them, while other sub-pixel regions have an out-of plane field applied to them. This allows some sub-pixel regions to display an image to a wide viewing region, while the other sub-pixel regions allow light transmission only to the side viewing directions. These second types of sub-pixels can then be used to reduce the overall contrast of the image being shown to the side viewer by the first type of sub-pixel, thereby obscuring the image information These methods have the disadvantage that not all the sub-pixel regions of the panel are used to display image data to the on-axis viewer, so the display loses both brightness and resolution compared to a standard LCD containing the same number of independent TFT switched sub-pixels, in which all are displaying information to the on-axis viewer.

US20060109224 (Au Optronics, 2005) describes an LCD panel in which the LC alignment is varied between two regions within a pixel, each region having an asymmetric viewing angle property, the two regions having opposite asymmetry. In the wide viewing angle mode, both sub-pixel regions are driven identically, the overall viewing angle property from both regions combined therefore being symmetric. In the narrow viewing angle mode, one region is driven with a different voltage to the other, resulting in an overall asymmetry for the display and an image which is obscured to the side viewer. However, this method also results in reduced display resolution and reduced brightness in the private mode.

In addition to schemes which rely on altering the manner in which the LC alignment or electrode layout of the panel are arranged in order to provide the view angle range switching, methods have been described whereby a software-only switch is applied to a standard LCD display to produce a private mode. These include US20040207594 (Sharp, 2003), GB2428152A1 (Sharp, 2005) and Rocket Software, Inc. (http://www.rocketsoftware.com). However, all of these methods necessarily reduce the quality of the displayed image to the legitimate viewer in the private mode.

JP 1999-11-30783 (Mitsubishi, 1999) describes an In-Plane-Switching (IPS) display, in which the brightness displayed to the on-axis viewer from any pixel in both modes (the grey level) is determined by the voltage between two interdigitated electrodes disposed on one of the cell substrates, which has an inherently very wide viewing angle. The display type is provided with a switchable privacy function by the addition of a third electrode on the opposing cell substrate allowing an out-of-plane field component to be applied to all pixels to generate an asymmetry in the brightness distribution. This method maintains nearly full brightness and resolution of the display in both modes, but it is only applicable to IPS type displays and it is believed that the privacy performance is not as strong as that from the type of display described here.

U.S. Pat. No. 6,646,707 (BOE Hydis, 2001) describes a fringe field switching (FFS) type display, in which both the pixel and counter electrodes are formed on the lower glass substrate of the display, overlapping one another and separated by a layer of transparent insulator material. The fringe field resulting from a voltage between the two electrodes extends into the bulk of the LC layer and is used to rotate the LC director, which is planar aligned parallel to the surface of the substrates, in the plane of the cell in order to control light transmission. No third electrode is used on the counter substrate and no variable viewing angle function is described.

A similar scheme to JP 1999-11-30783, which uses an FFS display, in which the two electrodes between which the grey level voltage is applied are disposed on top of one another on one cell substrate with an insulating layer between them, is described in US20060267905A1 (Casio, 2005). Again, a third electrode to allow switchable viewing angle properties is disposed on the opposite cell substrate. This scheme also, while maintaining the original display brightness and resolution, provides insufficient privacy strength. It also only describes a planar aligned LC device in which it is always the fringe field from the two electrodes on the lower substrate which controls light transmission.

A method in which switchable viewing angle is achieved for a Vertically Aligned Nematic (VAN) type display is disclosed in US20070046881 (Casio, 2005). This scheme uses two sets of electrodes on the substrate opposite the pixel electrode, one of which is registered vertically over the pixel electrode to produce a symmetric viewing angle range, the other set being offset to produce an oblique applied field and asymmetric viewing properties. This scheme however adds greatly to the complexity of the display panel and results in greatly reduced transmissive aperture in the display, thus reducing brightness.

US20070040780A1 discloses a number of schemes for providing a single layer LC panel with switchable viewing angle properties, including a method whereby a continuous pinwheel alignment (CPA) type display (also known as ASV) has the alignment arrangement of the LC director within each sub-pixel region altered to change the viewing angle properties of the pixel. However, the method outlined in the document, which uses only single layer electrodes on both substrates, has been shown to be problematic due to the gaps between the electrodes which provide the in-plane field disrupting the LC alignment in the public mode and degrading the wide viewing angle. This document also describes a method whereby a bias voltage is applied to the two halves of each CPA liquid crystal domain in the panel, creating an asymmetry in the brightness distribution with viewing angle. This effect has been shown to have a privacy performance which is not as strong as that of the device described here, however.

It is therefore desirable to provide an LCD display panel which is switchable between public and private viewing modes, requires no extra LC layer or other bulk-increasing components, and has brightness, resolution and quality of image equivalent to a standard public-mode-only LCD with the same number of TFT switching elements.

DISCLOSURE OF THE INVENTION

According to the invention, there is provided a liquid crystal device comprising an active matrix substrate and a counter-substrate having facing homeotropic alignment surfaces, between which is disposed a layer of nematic liquid crystal material, and carrying a pixel electrode arrangement and a counter-electrode arrangement, respectively, defining a plurality of pixel regions, each of at least some of which has a pixel electrode and a counter-electrode, arranged to apply a first electric field for controlling a liquid crystal director out-of-plane tilt angle, and a further electrode electrically insulated from the pixel and counter-electrodes and arranged to cooperate with at least one thereof to apply a second electric field for controlling the director in-plane azimuth angle.

The liquid crystal material may be of negative dielectric anisotropy.

The first field may substantially determine the on-axis electro-optic effect of the liquid crystal material of each of the at least some regions. The on-axis electro-optic effect may be substantially independent of the second field. The second field may substantially determine the angular variation of the electro-optic effect.

The first field may be substantially perpendicular to the alignment surfaces.

The second field may be substantially parallel to the alignment surfaces.

The layer may be arranged to provide a retardation of half a wavelength for visible light at a finite value of the first field.

The further electrodes may be disposed in a first layer separated from a second layer containing the pixel electrodes or the counter electrodes by a continuous electrically insulating third layer.

The pixel electrode of each of the at least some pixel regions may be divided into first and second halves separated by a gap.

Each of the at least some pixel regions may be arranged to have a multidomain liquid crystal structure in at least one operative state. The multidomain structure may at least cover the pixel electrode.

Each of the at least some regions may be arranged to have a continuous pinwheel alignment for a first value of the second field.

Each of the at least some regions may be arranged to operate in a two domain vertically aligned nematic mode for a second value of the second field. Each further electrode of the at least some regions may comprise a plurality of parallel finger portions.

Each pixel electrode of the at least some regions may be divided into first and second halves separated by a gap and each further electrode may be disposed on the active-matrix substrate and may have a portion which covers the gap. Each of the halves may be divided into inner and outer portions.

Each counter-electrode of the at least some regions may be divided into first and second halves separated by a gap and each further electrode may be disposed on the counter-substrate and may have a portion which covers the gap.

The fingers of each further electrode may extend substantially perpendicularly to the portion thereof.

The finger portions of all of the further electrodes may be substantially parallel.

The at least some regions may be arranged as interlaced first and second sets with the further electrode finger portions of the second set being substantially perpendicular to the further electrode finger portions of the first set.

Each pixel electrode of the at least some regions may have a plurality of substantially parallel elongate cut-outs. Each further electrode of the at least some regions may have portions disposed behind the cut-outs.

The pixel regions may be arranged as groups of adjacent regions with each group constituting a pixel and having at least one of the at least some pixels. Each group may comprise at least one other pixel without a further electrode. Each at least one other pixel region may have a continuous pinwheel alignment. As an alternative, each at least one other pixel region may have a multiple domain vertical alignment.

The active matrix substrate and the counter-substrate may be disposed between first and second linear polarisers whose transmission axes are perpendicular to each other. The transmission axes of the first and second polarisers may be oriented substantially parallel or perpendicular to the finger portions. As an alternative, the transmission axes of the first and second polarisers may be oriented substantially at 45° to the finger portions.

The at least some pixel regions may be arranged as third and fourth interlaced sets with the first electrode halves of the third set being arranged to receive a first bias voltage having a first polarity with respect to the second electrode halves of the third set and with the first electrode halves of the fourth set being arranged to receive a second bias voltage having a second polarity opposite the first polarity with respect to the second electrode halves of the fourth set. The third and fourth may be sufficiently large for the interlacing to be visible to a human viewer of the device. As an alternative, each of the third and fourth sets may comprise a single pixel and the pixels may be arranged to display spatially interlaced first and second images.

The display may comprise a display controller arranged to modify respective data values for the at least some pixel regions such that, when the modified image is displayed to a first viewer in a first position relative to the device, the image perceived by the first viewer through spatial averaging is substantially the same as an original image and such that, when the modified image is displayed to a second viewer in a second position relative to the second display device, the image perceived by the second viewer through spatial averaging is different from the original image. The original image may be substantially hidden in the image perceived by the second viewer. At least some of the data values may be modified in dependence upon a masking image.

The controller may be arranged to modify the data values such that localised groups of displayed image elements are perceived by the first viewer through spatial averaging to have substantially the same overall luminance as those image elements would have done without such modification.

It is thus possible to provide a novel pixel geometry and driving method for vertically aligned nematic liquid crystal displays. Such techniques allows, for example, a single liquid crystal layer to display an image in two possible modes, one of which has wide viewing angle properties (public mode) and the other in which the image is only discernible from a restricted range of viewing angles (private mode). In both modes, the image is of substantially the same brightness, resolution and quality (contrast, motion response time etc) as the equivalent conventional LCD containing the same number of independently switching display elements (sub-pixels).

In the public mode, the display may operate as a standard "Advanced Super View" (ASV) (IDW '02 Digest, pp 203-206) or Multidomain Vertical Alignment (MVA) (SID '98 Digest, p1077) type panel in which the LC director is aligned normal to the surface of the cell substrates and an out-of plane electric field applied between electrodes on opposing cell substrates causes the director to tilt down into the plane of the substrate, thereby determining the transmission of light through that pixel. Within each of at least some sub-pixel regions, the director may tilt into a number of azimuthal directions (multidomains) due to the influence of the applied field, for example, as determined by the electrode geometry and/or by shaped protrusions on the surface of the cell substrates, thereby generating a very symmetric viewing angle property and good public mode.

In the private mode, while the brightness of any pixel is still determined by the out-of plane field applied between the cell substrates, a fringe field generated between electrodes on one of the cell substrates which are disposed on different layers separated by an insulating layer may be used to modify the azimuthal orientation of the multidomains, thereby altering the viewing angle properties of the display.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

Like reference numerals refer to like parts throughout the drawings.

BEST MODE FOR CARRYING OUT THE INVENTION

In a preferred embodiment of the invention, the LCD is a vertically aligned nematic (VAN) type LCD operating in an advanced super view mode (ASV) whereby the sub-pixel display elements are comprised of one or more continuous pinwheel alignment (CPA) domains, which are typically 30-100 μm square.

Figure 1:
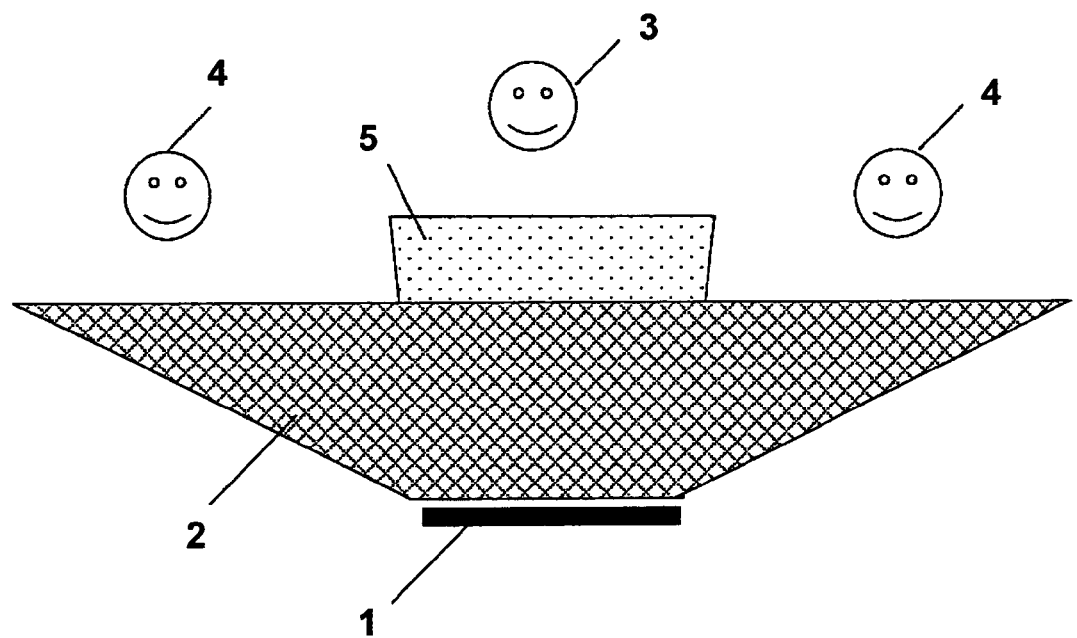
FIG. 1 shows an LCD display 1 with a wide viewing angle (public) mode 2 in which the displayed image is visible to both the on-axis viewer 3 and side viewers 4, and also a narrow viewing angle (private) mode 5 in which the displayed image is only visible to the legitimate on-axis viewer 3.
Figure 2:
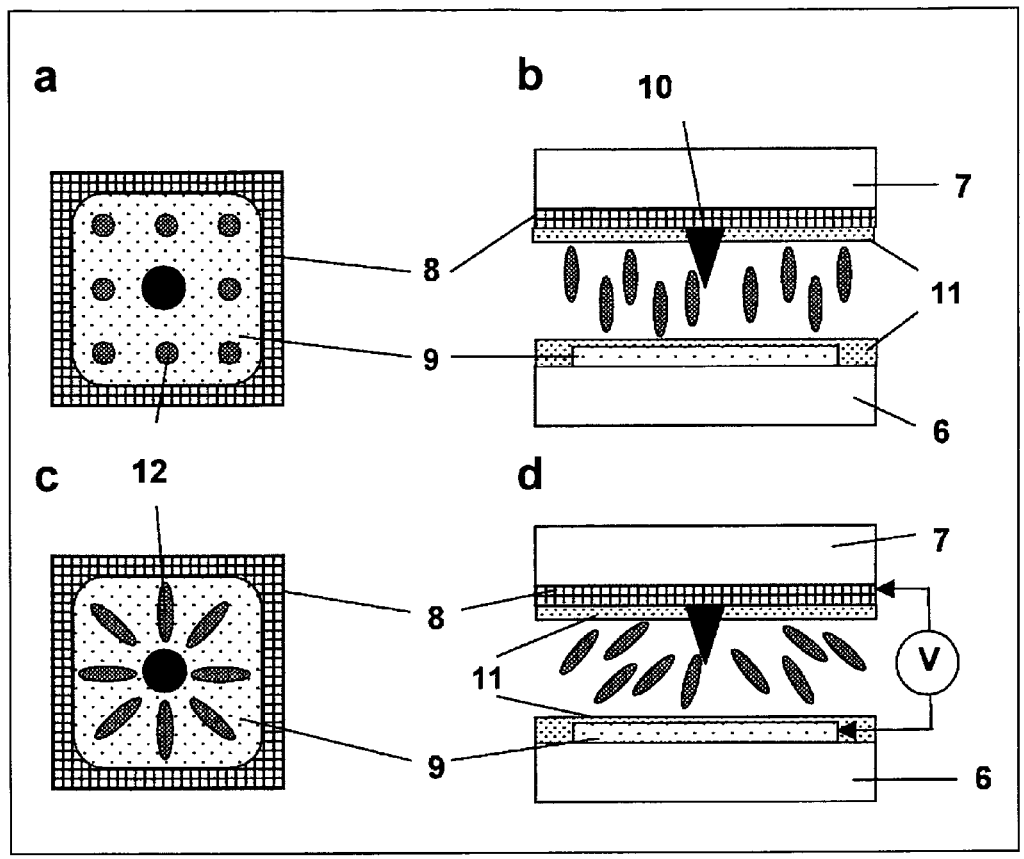
FIGS. 2a to 2d are schematic diagrams of a standard CPA or ASV type sub-pixel region with the pixel shown in the field off state from above (FIG. 2a) and as a cross section through the pixel (FIG. 2b) and in the field on state from these two directions (FIGS. 2c and 2d, respectively)

FIGS. 2a to 2d are schematic diagrams of a liquid crystal cell or pixel region forming part of a liquid crystal device comprising an array of such cells or regions. FIGS. 2a to 2d show a standard CPA domain viewed from above the LC cell (FIG. 2a) and as a slice through the cell (FIG. 2b) at zero applied voltage, and with a voltage applied between electrodes disposed on the inner surfaces of the opposing glass substrates (FIGS. 2c and 2d). The ASV type display comprises a lower active matrix glass substrate 6 and a counter substrate 7 opposed to each other with a predetermined separation. The counter substrate is coated with a transparent electrode material such as Indium Tin Oxide (ITO) which occupies substantially the whole area of the domain (the counter electrode 8). The lower substrate is disposed with a plurality of gate lines and data lines arranged in a matrix defining a plurality of sub-pixel regions. Each sub-pixel region can contain a plurality of CPA domains. A thin film transistor (TFT) is located near each intersection of the gate and data lines and controls the voltage signal applied to the pixel electrode 9 in the sub-pixel region. The pixel electrode is also made of ITO and is limited to a smaller area within each CPA domain than the uniform counter electrode 8. On the opposite substrate to the pixel electrode 9, there is disposed a colour matrix layer and also a "rivet" type protrusion 10 in the centre of the CPA domain. The inner surfaces of both substrates are coated with an alignment layer 11 forming homeotropic alignment surfaces for promoting homeotropic alignment of the LC molecules 12 of a layer of nematic liquid crystal material contained within, such as JALS 2017 (available from Japan Synthetic Rubber Co.).

The LC director (the average direction of the long axes of the LC molecules) is therefore aligned vertically in the cell with zero applied voltage between the substrates and the cell appears black between crossed polarisers. When a voltage is applied between the electrodes 8 and 9, this generates a first electric field for controlling the liquid crystal out-of-plane tilt angle. The resulting out of plane field causes the director of the negative dielectric anisotropy LC, such as the Merck GmbH material MLC6884, to reorient to lie orthogonal to the field. Light propagating in a direction orthogonal to the surfaces of the cell substrates (on-axis) then experiences a birefringence resulting in a conversion of its polarisation state and is transmitted through the crossed polarisers. The liquid crystal layer is arranged to provide a retardation of half a wavelength for visible light at a finite value of the first field. As the out-of plane field does not provide a preference for the azimuthal orientation of the LC director, the central rivet 10 and the fringe field at the edge of the pixel electrode 9 are used to induce a radial alignment of the director around the central rivet in the domain. This radial alignment causes the light transmitted by the domain propagating at an angle to the substrate normal (off-axis) to be symmetrically distributed, i.e transmitted to a degree substantially independent of the azimuthal direction of its propagation, resulting in very wide viewing angle properties for the display.

The preferred embodiment has the following features differentiating it from the standard CPA pixel structure, and providing the added functionality of the switchable viewing angle.

The pixel electrode is divided into two halves, with a 5-15 μm gap creating a split pixel electrode 13, allowing each half of the CPA domain to be individually addressed. The patterning of the ITO layer forming the pixel electrode can be produced by any standard photolithography process such as deposition and patterning of a photoresist layer e.g. S1805, followed by a wet etch of the ITO. Where the pixel region is arranged to have a multidomain liquid crystal structure in at least one operative state, the multidomain structure at least covers the pixel electrode.

A layer of insulating material 16 is deposited onto this split pixel electrode. A preferred insulating layer is a combination of 200 nm thickness SiOx and 200 nm SiNx deposited via plasma enhanced chemical vapour deposition (PECVD). It should be noted that, although this preferred insulating layer is a double layer only due to it having been found to provide more effective electrical insulation than a monolayer, the device is by no means limited to requiring such a multilayer. It should also be noted that, if a multilayer insulating layer 16 is used, this can be arranged to be a functional multilayer, such as a bragg reflector, if this enhances the optical properties of the device.

Onto this insulating layer is deposited a further layer of electrode material such as ITO or Aluminium for forming a further electrode. This can be deposited by any known method such as RF sputtering or vacuum evaporation. ITO has the advantage that it is transparent and so does not reduce the transmission of light through the pixel. This further layer of electrode is then patterned by similar means to the pixel electrode. This further electrode is patterned such that it has a central stripe, which substantially aligns to cover the central gap in the split pixel electrode 13, and has a number of fingers, of 2-10 μm thickness extending orthogonal to the central stripe across the extent of the pixel. As such, it forms the comb electrode 14.

In a preferred geometry, there are three fingers per CPA domain on the comb electrode, running substantially over the edges and centre of the pixel electrode. However the number and relative thickness of the fingers can be varied to a large extent while still providing the required functionality described below. The combined split pixel 13 and comb 14 electrodes appear to form a substantially solid electrode region when the lower substrate 6 is viewed from above 15.

Figure 3:
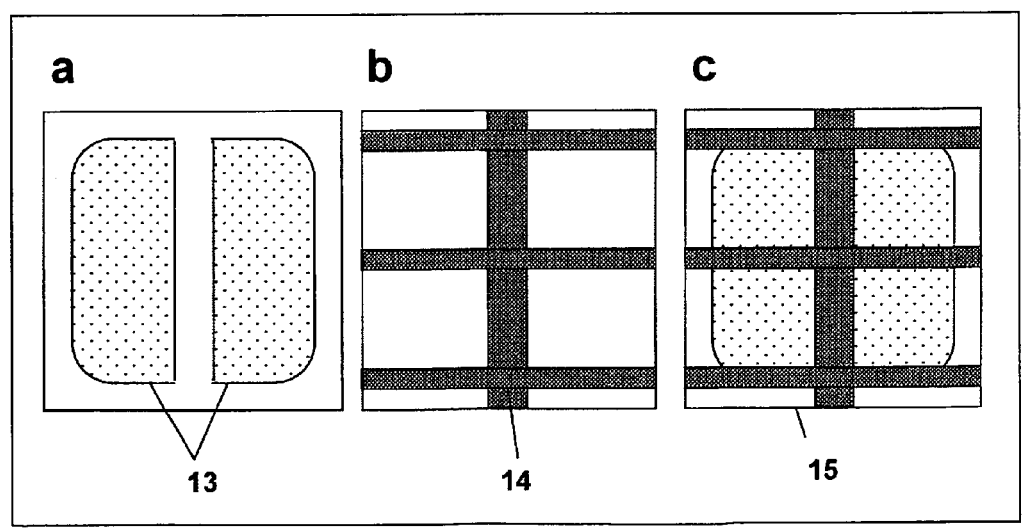
FIGS. 3a to 3c are schematic diagrams of the electrode geometry of a CPA domain region on the lower substrate of an embodiment of the switchable privacy display device with the pixel electrode 13 (FIG. 3a), comb electrode 14 (FIG. 3b) and the combination of the two electrodes 15 (FIG. 3c) which are separated by an insulating layer shown viewed from above.

These electrode geometries are shown in FIGS. 3a to 3c. The dimensions given above are those found to be suitable for a typical CPA domain of 50 μm square extent. These can be varied widely while still retaining their designed functionality, however.

Figure 4:
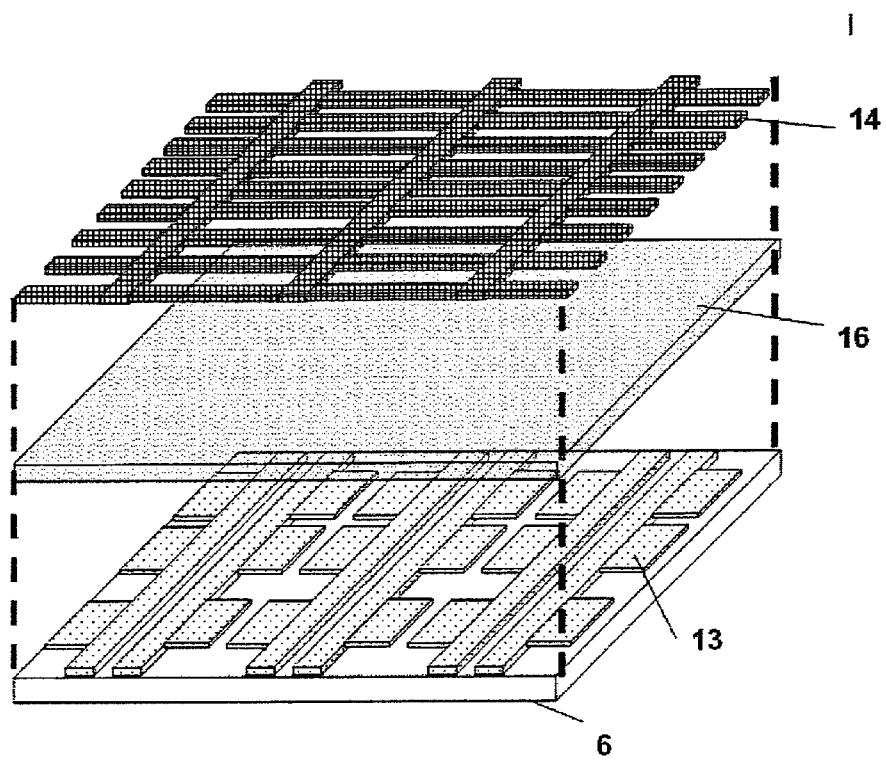
FIG. 4 is an exploded view of nine such electrode regions as shown in FIG. 3, with the insulating layer also shown.

The split pixel and comb electrodes of neighbouring CPA domain regions can be connected in order to enable multiple CPA domains to form a sub-pixel driven via a single TFT switch, as is standard in ASV type displays. A typical display will have three CPA domains per colour sub-pixel and three colour sub-pixels per white pixel. The sub-pixels in the display are addressed by an active matrix array as is standard in LCDs. An exploded schematic view of a region of the lower substrate comprising pixel and comb electrode area for driving nine such CPA domains is shown in FIG. 4.

Figure 5:
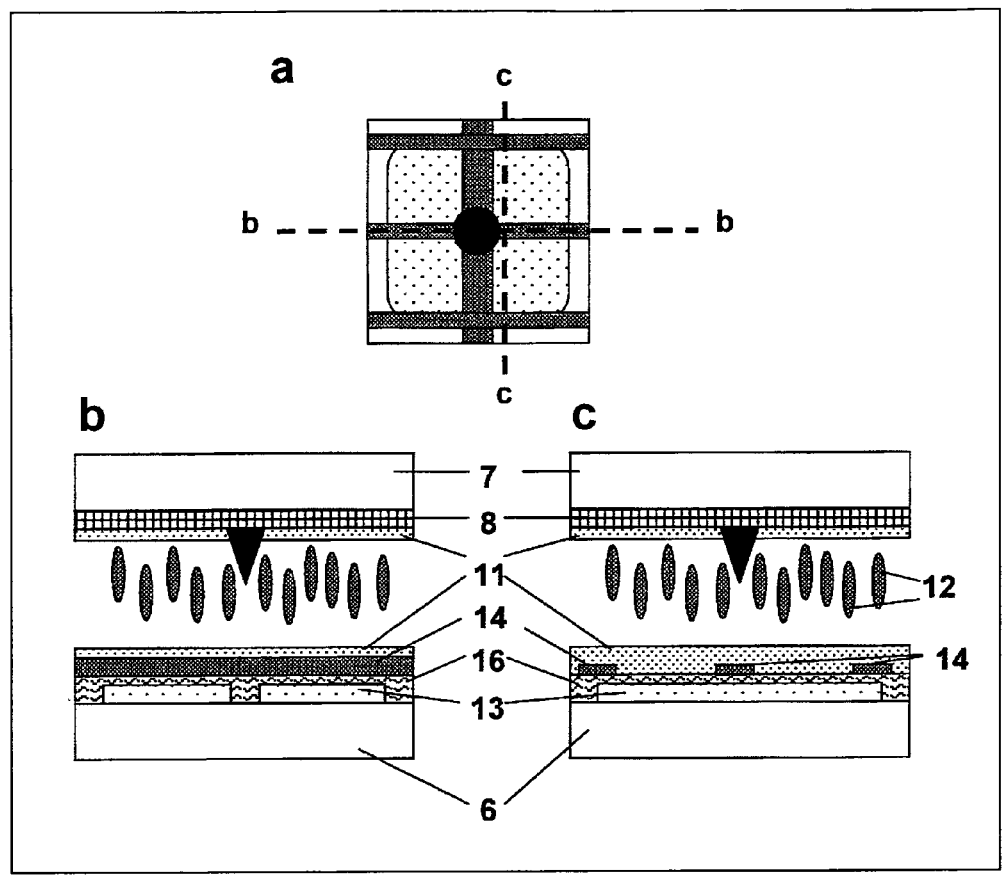
FIGS. 5a to 5c are schematic diagrams of a sub-pixel region of an embodiment of the switchable privacy display device with the region shown viewed from above in FIG. 5a and from two orthogonal cross-sections through the device on section lines b-b and c-c in FIGS. 5b and 5c, respectively.

The inside surfaces of both substrates are coated with the homeotropic alignment layer forming homeotropic alignment surfaces as in the standard CPA device and the substrates are assembled to oppose each other with the predetermined cell gap (usually 3-5 μm,) filled with a layer of nematic liquid crystal material such that, when a field is applied across the cell, the reoriented LC layer has an optical retardation making it substantially a half waveplate for 550 nm wavelength light. The cell gap can be controlled by the insertion of glass spacer beads of uniform diameter, or any other known method. The assembled cell is then as depicted in the two orthogonal cross sections of FIGS. 5b and 5c.

In the public mode, the pixel is addressed such that a voltage applied between the counter electrode 8 and the split pixel electrode 13 results in a first electric field which controls the liquid crystal director out-of-plane tilt angle and hence determines the out-of-plane reorientation of the bulk of the LC material and therefore the transmission of light through the pixel. The voltage applied to the comb electrode 14 is selected so as to promote a uniform field between the counter electrode 8 and the pixel electrode 13. In the case of the dielectric reduction of the field strength caused by the insulating layer 16 being insignificant, the voltage on the pixel 13 and comb 14 electrodes will be substantially the same. If the dielectric loss of field strength is not insignificant, the voltage applied to the comb electrode 14 will be some value between the voltages on the pixel electrode 13 and the counter electrode 8, selected so as to optimise the uniformity of the field in the bulk of the LC layer.

In this case, the application of the uniform electric field will cause the negative dielectric anisotropy LC to reorient to lie orthogonal to the direction of the applied field and, as in the case of the standard CPA device, the azimuthal orientation of the LC director will be determined by the influence of the central rivet 10 and the fringe field from the edge of the pixel electrode 13. The LC director will therefore take on the radial alignment characteristic of the CPA device shown in FIG. 2c, resulting in the wide viewing angle property for the display.

In the private mode, the voltage applied between the pixel 13 and counter electrode 8 still determines the first electric field and hence the out-of-plane reorientation of the bulk of the LC material and therefore the transmission of light through the pixel. However, the voltage on the comb electrode 14 is altered such that an electric field substantially different to that in the public mode now exists between the pixel 13 and comb 14 electrodes. The fringes of this electric field will extend into the bulk of the LC layer resulting in a non-uniform field across the area of the pixel. The influence of this fringe field on the azimuthal orientation of the LC director will override the influence of the central rivet 10 and the fringe field resulting from the edge of the pixel electrode 13, causing a reorientation of the LC director in the plane of the cell. As the strength of the fringe field from the comb electrode 14 is increased, the LC director progressively deforms from its initial radial arrangement towards lying parallel to the fingers of the comb electrode 14, eventually forming a two domain VAN structure. Thus, the comb or "further" electrode cooperates with one of the other electrodes to form a second electric field which controls the director in-plane azimuth angle.

In this way, with the voltage applied between the pixel 13 and counter 8 electrodes controlling the out-of-plane tilt of the LC, and the voltage applied between the comb 14 and pixel 13 electrodes determining the in-plane azimuthal orientation, good three-dimensional control of the LC director is achieved with only three electrodes.

Figure 6:
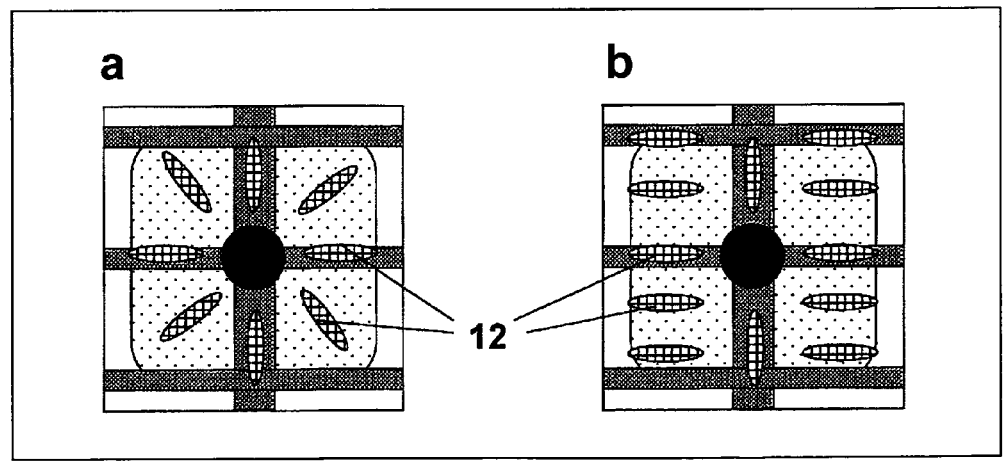
FIGS. 6a and 6b are schematic diagrams of an embodiment of the device in the out-of-plane field on (transmitting) state without a fringe field between the pixel and comb electrodes (FIG. 6a) and with a fringe field between the pixel and comb electrodes (FIG. 6b)

FIGS. 6a and 6b shows the azimuthal orientation of the LC molecules 12 under an applied out-of-plane field without a fringe field between the comb 14 and pixel 13 electrodes (FIG. 6a), and with a fringe field (FIG. 6b), showing the change from a radial LC alignment in the plane of the cell to a two-domain alignment. For a first (zero) value of the second field, a continuous pinwheel alignment (FIG. 6a) is provided. For a second (non-zero) value of the second field, operation is in a two domain vertically aligned nematic mode.

This in-plane reorientation of the LC director may not on its own result in a large enough asymmetry of the light transmitted by the pixel to generate a privacy effect. However, if the voltage on the two halves of the split pixel electrode 13 is altered such that a positive bias voltage is applied to one half and a negative bias voltage is applied to the other half, the overall transmission of the light through the pixel on-axis will not be altered, but the transmission of light to off-axis viewers will now be strongly asymmetric. This is illustrated in FIGS. 7a to 7d which show the device in the two domain VAN state as a result of the fringe field from the voltage between the pixel 13 and comb 14 electrodes, viewed from above and in cross-section, without (FIGS. 7a and 7b) and with (FIGS. 7c and 7d) the bias voltage applied to the two halves of the pixel electrode 13.

Figure 8:
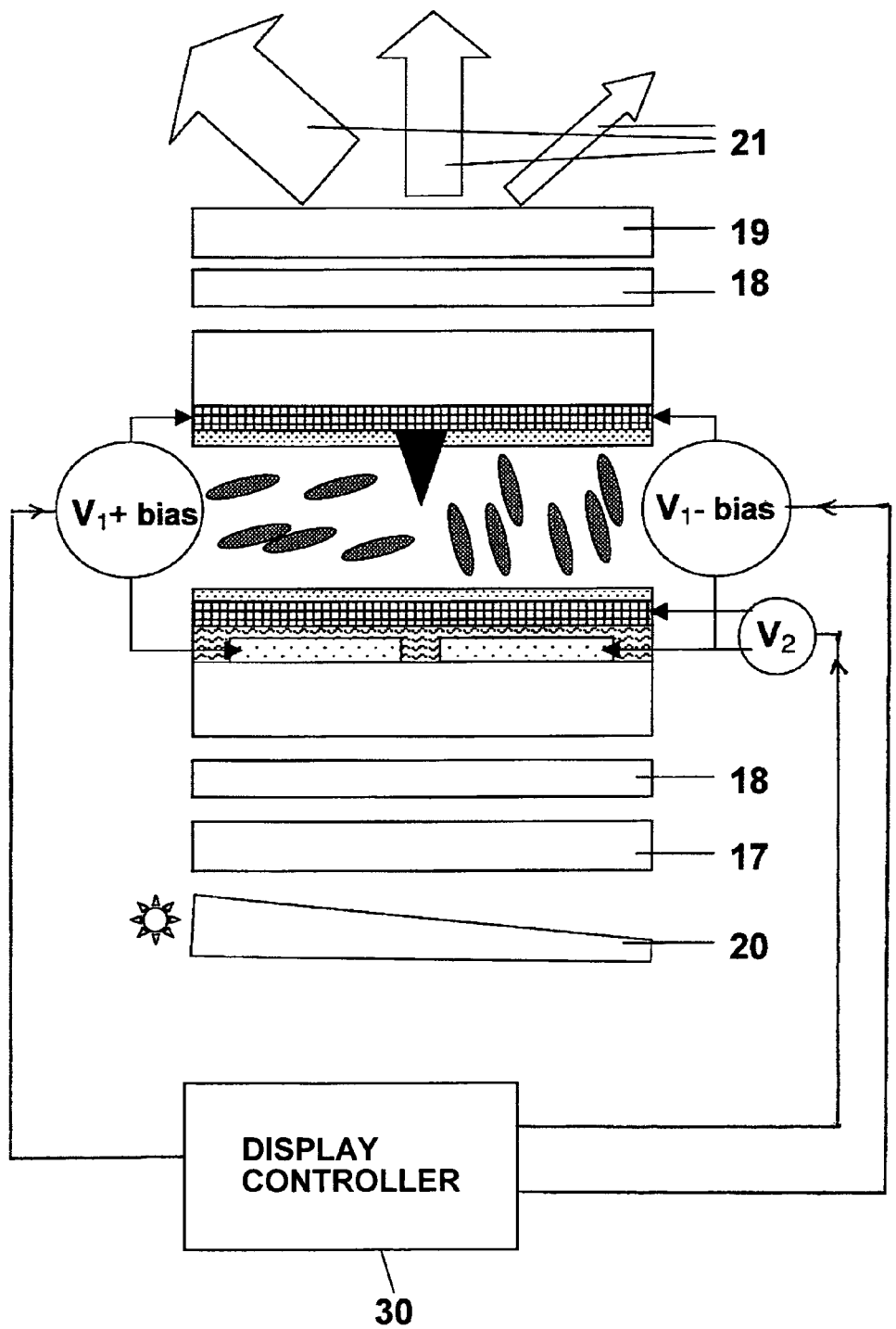
FIG. 8 is a schematic diagram of a cross-section of an embodiment of the device shown operating in the private mode state as in FIG. 7(b), positioned within a standard optical stack typical of a VAN type LCD display.

FIG. 8 shows the pixel being driven in the private mode and placed in a typical stack for an LCD display, including polariser 17 (which may include a reflective polariser), optical compensation films 18, analyser 19 (which may include anti-reflection and/or anti glare films on its outer surface), and backlighting unit 20 (which may include a scattering mirror surface on its rear, as well as brightness enhancement prism films on its front surface). The further electrodes are disposed in a first layer separated from a second layer containing the pixel electrodes (or the counter electrode(s) in an alternative arrangement) by a continuous electrically insulating third layer.

The asymmetric intensity of the transmitted light is indicated by the different widths of the arrows representing light throughput 21. In order for the pixel to transmit the maximum brightness to the on-axis viewer while in the private mode, the transmission axes of the polariser and analyser must be oriented at +/−45° to the fingers of the comb electrodes.

Figure 9:
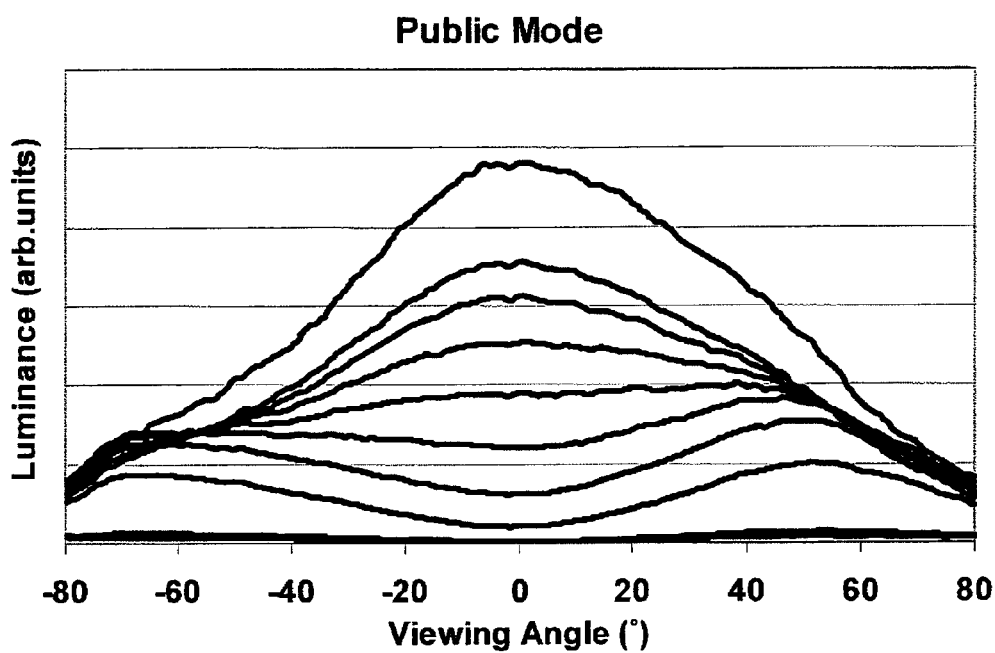
FIG. 9 is a graph showing the relative luminance as function of viewing angle in the horizontal plane of a prototype embodiment of the device operating in the public mode, for several different voltages applied between the pixel 13 and counter 8 electrodes.

The measured performance of a prototype device constructed to the specification described above is shown in FIG. 9. This plot shows the angular distribution of light transmitted by the pixel for a range of voltages between the pixel 13 and counter 8 electrodes from 0 to 5V. The voltage between the pixel 13 and comb 14 electrodes in this mode was held at 0.5V. (Values given are r.m.s. voltages as the LC cell was driven with an a.c square waveform at 120 Hz. To maintain a constant voltage difference between electrodes, all waveforms applied to the electrodes were of the same frequency and in phase with each other).

Figure 7:
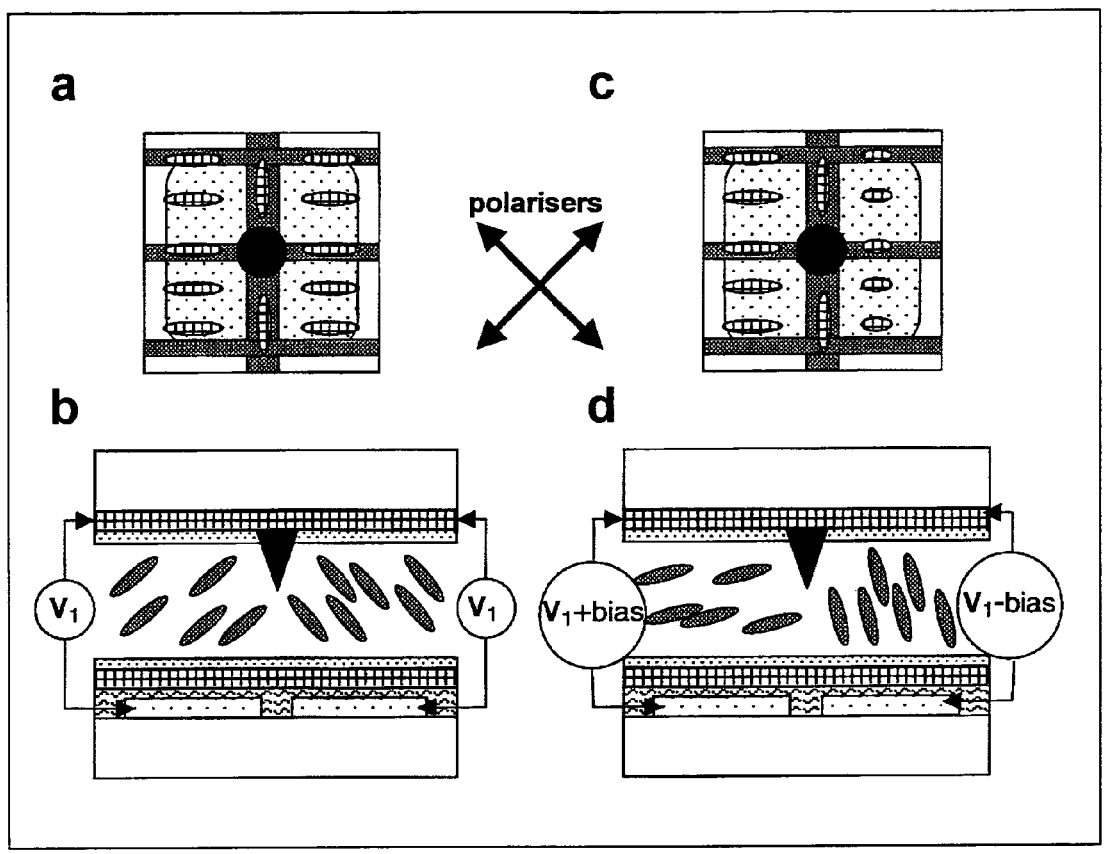
FIGS. 7a to 7d are schematic diagrams of an embodiment of the device in the out-of-plane field on state, with a fringe field between the pixel and comb electrodes, without a bias voltage applied between the two halves of the pixel electrode (FIGS. 7a and 7b) and with a bias voltage applied between the two halves of the pixel electrode (FIGS. 7c and 7d), both states being shown as viewed from above (FIGS. 7a and 7c) and as a cross-section (FIGS. 7b and 7d)
Figure 10:
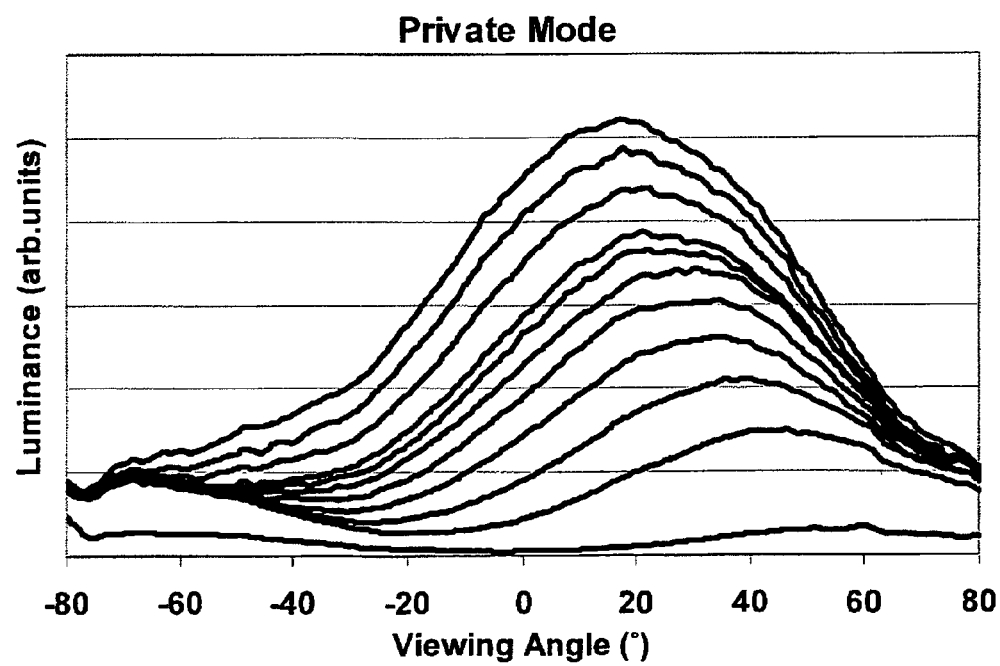
FIG. 10 is a graph showing the relative luminance as function of viewing angle in the horizontal plane of a prototype embodiment of the device operating in the private mode, for several different voltages applied between the pixel 13 and counter 8 electrodes.

FIG. 10 shows the angular distribution of light transmitted by the pixel for the same range of voltages between the pixel 13 and counter 8 electrodes as the previous plot. In this case however the voltage on the comb electrode has been changed to −0.5V (the minus sign indicating the square wave is out of phase with that supplying the voltage to the pixel 13 and counter 8 electrodes), and a bias voltage of 1.5V has been applied to the two halves of the pixel electrodes 13. This results in the LC adopting the two-domain VAN arrangement as shown in FIG. 7*b*, and as such comprises the asymmetric private mode.

In order to generate a stronger privacy effect, the polarity of the bias voltage applied to the two halves of the split pixel electrode 13 can be reversed over regions large enough to be visible to the eye from the normal viewing distance. Thus, the pixel regions are arranged as "third" and "fourth" interlaced sets. First electrode halves of the third set receive a first bias voltage having a first polarity with respect to second electrode halves of the third set. First electrode halves of the fourth set receive a second bias voltage having a second polarity opposite the first polarity with respect to second electrode halves of the fourth set. The third and fourth sets are sufficiently large for the interlacing to be visible to a human viewer of the device. This will reverse the direction of the asymmetric luminance profile shown in FIG. 10.

Figure 11:
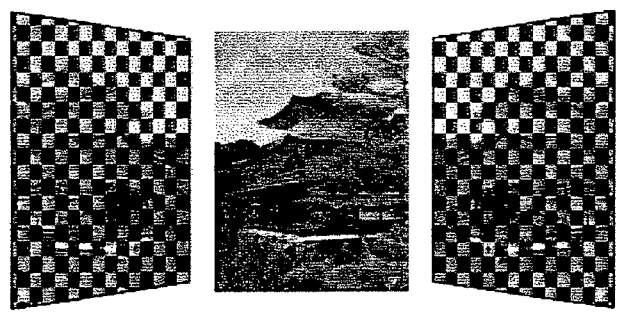
FIG. 11 is a simulated image as it would appear displayed on the prototype device operating in the private mode, as per the measured results shown in FIG. 9, as viewed on-axis and from +/−40°.

For the off-axis viewer, this will create a pattern of bright and dark regions which will obscure the image being displayed to the on-axis viewer. The image observed by the on-axis viewer will remain unaffected as the direction of asymmetry does not affect the luminance transmitted on-axis. The relative luminance values at viewing angles of +40° and −40° taken from the data shown in FIG. 10 can be used to generate simulated images of the privacy effect in such a display, the result of which is shown in FIG. 11.

Figure 12:
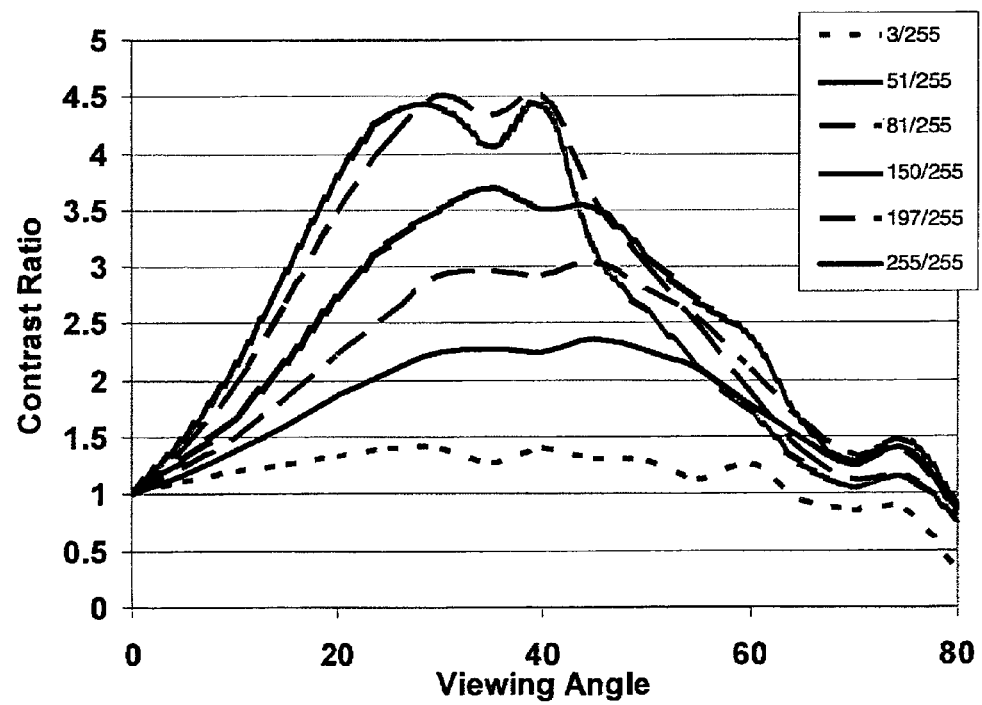
FIG. 12 is a graph showing the luminance contrast between regions of a device in the private mode with opposite polarity of the bias voltage applied between the two halves of the pixel electrode 13, for a range of relative on-axis transmission luminances (grey levels)

The measure of the strength of this privacy effect is the difference in luminance observed by the off-axis viewer between regions of opposite bias voltage, or contrast ratio. FIG. 12 shows this contrast ratio as a function of viewing angle for a range of relative on-axis luminance values (grey levels).

It should be noted that although FIGS. 9-12 describe the measured performance of a prototype device constructed to the specification of the preferred embodiment described, this is not an indication of the optimum performance of a device of this type. Myriad variations on the electrode geometries, cell thickness, LC material, drive voltages and other device parameters are possible which still fall within the scope of the claims below, and it is to be expected that some of these will lead to improved performance for any or all of the display metrics.

It can therefore been seen that the two added electrode features of this embodiment over a standard CPA device provide the two required functions to enable a privacy mode to be generated by the same LC layer as provides the image in the public mode. The comb electrode 14 provides the control over the azimuthal orientation of the LC director, and the split pixel electrode allows the two halves of the CPA domain to be addressed independently, or a bias voltage to be applied between the two. It should be noted that, although these added electrode features have been described for this embodiment as both being on the lower cell substrate 6, in further embodiments either or both of the features may be fabricated on the counter substrate 7, while still providing the same added functionality over the standard ASV type display. The preferred arrangement for locating these added features will depend on the relative ease of manufacture and of addressing the display in both public and private modes of the various combinations of electrode location.

Also, in further embodiments, the pixel electrode is left un-split and, rather than apply a bias voltage between the two halves of the CPA or MVA domain to obtain a privacy pattern off-axis, the azimuthal reorientation of the LC director controlled by the comb electrode is used in combination with a software adaptation to obtain strong privacy.

This software adaptation could be a straightforward luminance increase of the black level of the displayed image, as used in the Sharp Sh702 is mobile phone display which reduces the image contrast displayed to the side viewer to an unresolveable level. It could also be one of other known methods such as that described by GB2428152A1 or the "Rocket Shades" software method. The advantage of using the software privacy methods in combination with the embodiments described here is that the added functionality provided by these embodiments allows strong privacy to be achieved via the known software methods with reduced image degradation to the legitimate viewer relative to the software method used in isolation. It may also enhance the type of privacy effect which the device is capable of, e.g the display of a high-information content, or full colour distracting or obscuring image to the side viewers 4, or the capability to reconfigure the content and appearance of the side image to allow either user customisation or adaptive privacy dependent on the main image content being displayed to the on-axis viewer 3. Any of the embodiments described herein may be used in combination with image processing techniques to minimise the additional manufacturing steps required to implement the device and enhance the privacy effect.

As disclosed in GB 2428152A1, the contents of which are incorporated herein by reference, a display controller 30 modifies data values supplied to the pixel regions so as to enhance the privacy of the display. When the image is modified in this way and displayed to a viewer 3, the image perceived by the viewer is spatially averaged so that it appears substantially the same as the original image. However, a viewer 4 outside the private viewing range perceives, through spatial averaging, an image which is different from the original image. The original image may thus be substantially hidden in the image perceived by the viewer 4. At least some of the data values are modified in dependence on a masking image for hiding the original image to the viewer 4. For the viewer 3, the controller modifies the data values such that localised groups of displayed image elements are perceived by the viewer through spatial averaging to have substantially the same overall luminance as the image elements would have done without such modification.

For example, as described in GB2428152A1, adjacent pairs of pixels or pixel regions cannot be resolved by the viewer because the pixels or pixel regions are too small to be perceived individually. The data values supplied to adjacent pairs of pixels (or sets of pixels) are modified such that the data value supplied to one of the pixels is increased whereas that supplied to the other is reduced in accordance with a masking pattern. For a viewer 3 on or near the display axis, the brightnesses displayed by the pixels are averaged and appear the same as they would without modification of the pixel data. However, for viewers 4 outside the private viewing regions, the masking image or pattern becomes visible and is chosen so as to provide increased obscuring of the "private" image. The privacy effect provided by the display may therefore be increased by using such imaging processing techniques. Any of the techniques disclosed in GB2428152A1 may be used for this purpose.

It should be noted that it may be particularly advantageous for both added electrode features to be located on the counter substrate 7, i.e. the counter electrode (Vcom) 8 is split into two regions each covering half of each of the CPA domains, the insulating layer 11 is deposited onto this split counter electrode and the comb electrode 14 then deposited onto this insulating layer and patterned. The colour filter layer and rivet 10 array would then be deposited as usual on to this modified counter substrate. This will enable the lower substrate 6, which usually contains the active matrix thin film transistor (TFT) array and is therefore more complex and expensive to manufacture, to remain unchanged. The added functionality could therefore be provided simply by using the modified counter substrate with existing lower TFT substrates. This arrangement would also require only a small alteration to the display driving electronics: The lower TFT substrate could be addressed as usual, while the Vcom voltage usually applied to the counter electrode 8 would be made switchable to allow the bias voltage to be applied to the two halves of the CPA domains in the private mode, and an extra connection would be made to the comb electrode 14.

It may however be more advantageous to locate the split pixel electrode on the lower TFT substrate and have additional TFT switches to drive the two halves of the CPA domains fully independently. It is expected that this will allow a more optimised privacy effect, as the magnitude of the voltage difference applied to the two halves of the CPA domain can then be varied over the area of the display, and used to optimise the privacy according to the on-axis luminance of each pixel.

Figure 13:
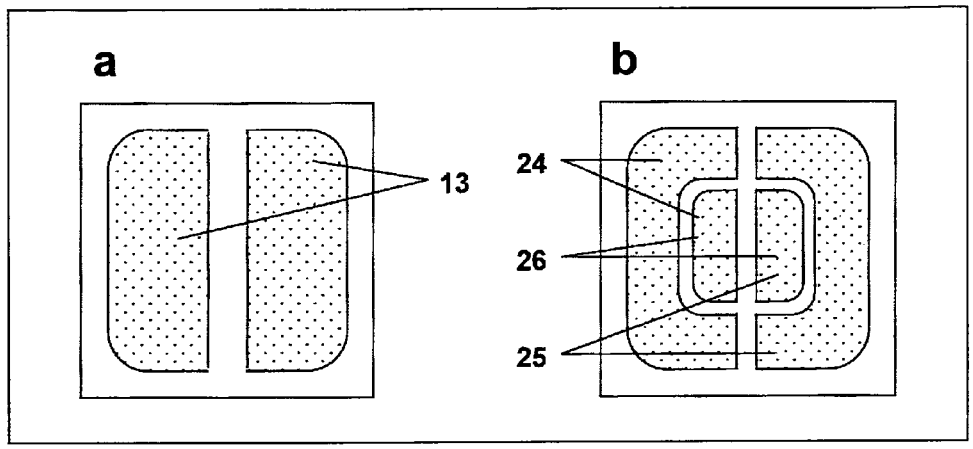
FIGS. 13a and 13b are schematic diagrams of a divided pixel electrode geometry for driving an ASV domain with both a left-right bias voltage for privacy and with spatial dithering for improved public mode.

It is also known that the capability to drive separate regions of the sub-pixels of an LCD display independently for a spatial dithering effect can allow improved viewing angle properties and switching speeds for the display in the public mode (SID '07 Digest pp 1003-1006, SID '07 Digest, pp 1725-1728). Using the split pixel electrode 13 (FIG. 13*a*) as depicted in FIGS. 3*a* to 3*c* for such a spatial dithering function results in an asymmetry of the viewing angle properties which is undesirable for the public mode, as the dither would be limited to the entire left or right half of the CPA or MVA domain. This is mitigated either by reversing the half of the sub pixel which is turned on for the low grey level states every sub-pixel region, or every frame period, to average out the asymmetry, or by adopting a more complex electrode design such as that in FIG. 13*b* which is capable of driving a reduced area of each half of the domain 26 for the dither effect, or the entire left 24 or right 25 halves of the domain independently for privacy. For example, in the public mode, a positive bias would be applied to regions 26 relative to the remainder of the electrode area. These regions contain areas of both left and right halves of the CPA domain, so light is transmitted symmetrically to all viewers for all image grey levels, despite the regions 26 transmitting a greater or lesser proportion of light than the remainder of the domain electrode area. In the private mode, a bias is applied between regions 24 relative to regions 25, approximating the bias between regions 13 of the aforementioned split pixel electrode. Each of these regions contains half of the CPA domain, so causing one to transmit a greater proportion of light than the other results in asymmetric transmission overall, from which a privacy effect can be obtained.

It is also the case that the added functionality of the 3D control of the LC director provided by these embodiments allows novel pixel addressing schemes for further optimisation of viewing angle, contrast ratio at wide viewing angle, colour stability with changing viewing angle, switching speed and other display metrics in the public and private modes.

It should also be noted that, although the embodiments above are described as operating as a standard ASV type display in the public mode, in further embodiments, the liquid crystal mode of the display in the public mode can be any vertically aligned nematic type display with any number of multidomains within each sub-pixel region e.g. the monodomain VAN mode, MVA mode (SID '98 Digest p1077), PVA mode, S-PVA mode (SID '04 Digest pp 760-763) PSA mode (SID '04 Digest pp 1200-1203) etc.

It is also the case that in addition to a privacy function, the asymmetric viewing angle provided by the device in the private mode allows the device to display separate images to the opposite side viewers 4, i.e. a "dual view display". In this application, the bias direction of the split pixel electrode 13 is patterned over a smaller scale than that described to generate the obscuring pattern in the private mode above, e.g. every other colour sub-pixel. Two different images are then interlaced with the same pattern as the bias direction and displayed, whereupon the asymmetric viewing angle of the display causes the images to be substantially separated to the separate off axis viewers. For example, each of the third and fourth sets may comprise a single pixel and the pixels may be arranged to display spatially interlaced first and second images.

With the split pixel electrode located on the lower TFT substrate, and each half of the CPA domain therefore independently addressable with is own TFT switch, then the pattern of the bias direction is completely reconfigurable and the device is switchable between a public mode, a private mode with a single image displayed and a macroscopic bias pattern used, and a dual view mode with two interlaced images displayed and a matching microscopic interlaced bias pattern used to separate the two images to the two separate side viewers.

In a further embodiment, the fingers of the comb electrode 14 are arranged to lie parallel or perpendicular to the transmission axis of the polariser 17 or analyser 19. In this way, when the voltage is applied between the pixel 13 and comb 14 electrodes, the fringe field from which reorients the azimuthal alignment of the LC director, the LC alignment configuration is changed from one in which at least some or most of the LC is aligned substantially at 45° to the polarisers transmission axis 18, to one in which substantially all of the LC is aligned parallel to the polariser transmission axis.

In this configuration, there is substantially no transmission of light through the device on axis, but the out-of-plane field due to a voltage applied between the pixel 13 and counter 8 electrodes will control the amount of light transmitted to the side viewer. In this way, if the comb electrode extends over a limited proportion of all the display area, those pixel regions which are without a comb electrode continue to display the image to the on axis 3 and side viewers 4, while those pixel regions which have the azimuthal orientation of the LC reoriented by the presence of the comb electrode can be used to transmit a degree of excess light to the side viewers 4. This degree of excess light can be controlled such that it is large for dark regions of the displayed image and small for bright regions of the image, causing the side viewers 4 to observe a substantially uniform brightness across the whole of the area of the display, irrespective of the image being displayed to the on-axis viewer 3. In this manner, the side viewers 4 observe no image contrast and a privacy effect is achieved. The degree of excess light can also be controlled to exceed the brightness of the image displayed to the side viewer and therefore display a different, obscuring image. This embodiment has the advantage that no split in the pixel electrode 9 is required, simplifying manufacture of the device. It also has the advantage that, as it does not produce different regions of the display with asymmetric viewing angle properties, no pattern visibility occurs for the on-axis viewer.

Figure 14:
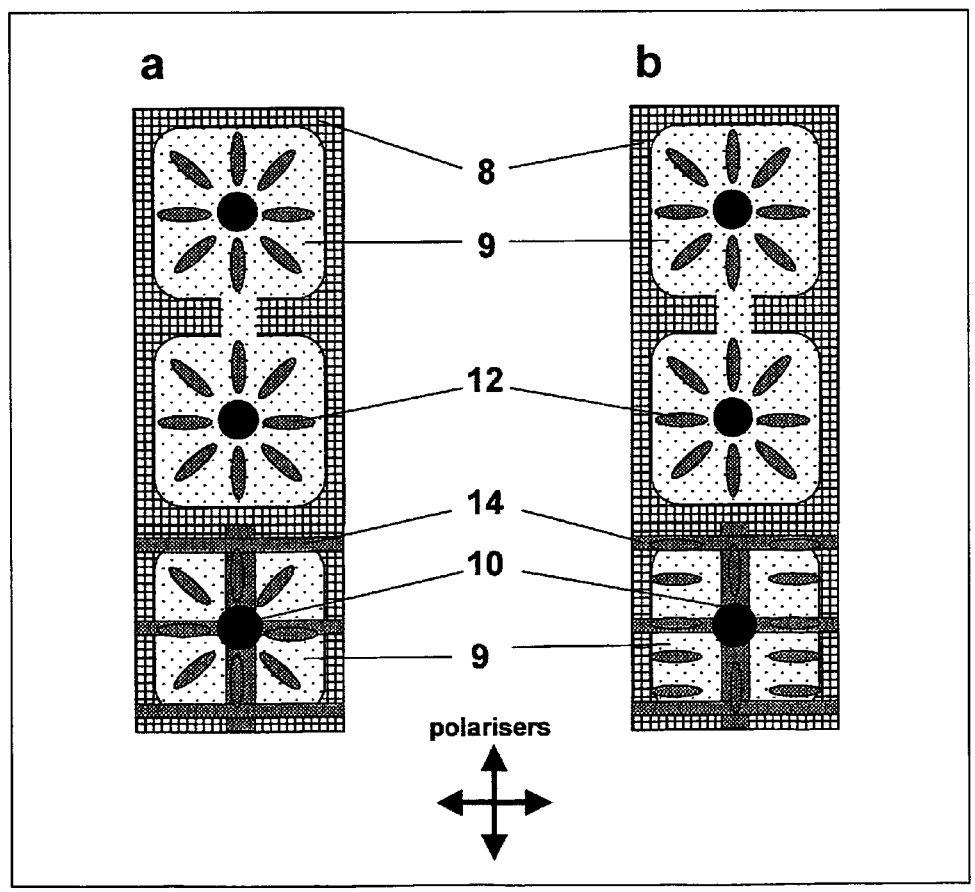
FIGS. 14a and 14b are schematic diagrams of a sub-pixel region of a further embodiment of the device operating in the public (FIG. 14a) and private (FIG. 14b) modes.

FIGS. 14*a* and 14*b* show the pixel electrode geometry and LC orientation in this embodiment in the public (FIG. 14*a*) and private (FIG. 14*b*) modes. The pixel regions are arranged as groups of three adjacent regions with each group constituting a pixel and having at least one (in this case having one) pixel region with the comb electrode and at least one (in this case two) other pixel region without the comb electrode and with a continuous pinwheel alignment.

This method of obtaining privacy, by using regions of the display in which the out-of-plane field causes the LC to reorient out of the plane of the cell into an azimuthal direction at 45° to the display polariser transmission axis to display an image to all viewers, while using some regions of the display in which the azimuthal orientation of the LC is parallel to the display polariser transmission axis to transmit excess light to the side viewer, is similar to that described in US20070040975A1 and SID '07 Digest pp 756-759. However this embodiment has the advantage that the regions of the display which have the azimuthal LC orientation parallel to the polariser transmission axis in the private mode and therefore transmit no light to the on-axis viewer 3 can have their orientation rotated back to 45° to the polariser transmission axis in the public mode, and therefore brightness and resolution of the display in the public mode is increased over the prior art.

In a further embodiment, the orientation of the fingers of the comb electrode 14 is varied from horizontal to vertical over areas large enough to be visible from the normal viewing distance. The pixels are thus arranged as interlaced first and second sets with the fingers of the comb or "further" electrodes of the second set being substantially perpendicular to the fingers of the further electrodes of the first set. This results in regions in which the viewing angle properties of the display are asymmetric in the horizontal plane contrasting with regions in which the light transmission is asymmetric in the vertical plane. This results in an obscuring image being visible to the off-axis viewer 4 in both the horizontal and vertical directions, and may also allow the pixel electrode 9 to remain unsplit.

It should be noted that, in the embodiments described above, the comb electrode 14 is positioned on top of the pixel electrode 13 on the lower substrate 6. As the comb electrode 14 is small in total area relative to the pixel electrode 13, most of the LC layer is subject to the out-of-plane field resulting from the voltage between the pixel 13 and counter 8 electrodes, so it is this voltage which determines the transmission of light to the on-axis viewer 3 in both public and private modes, not the voltage between the counter 8 and comb 14 electrodes.

Figure 15:
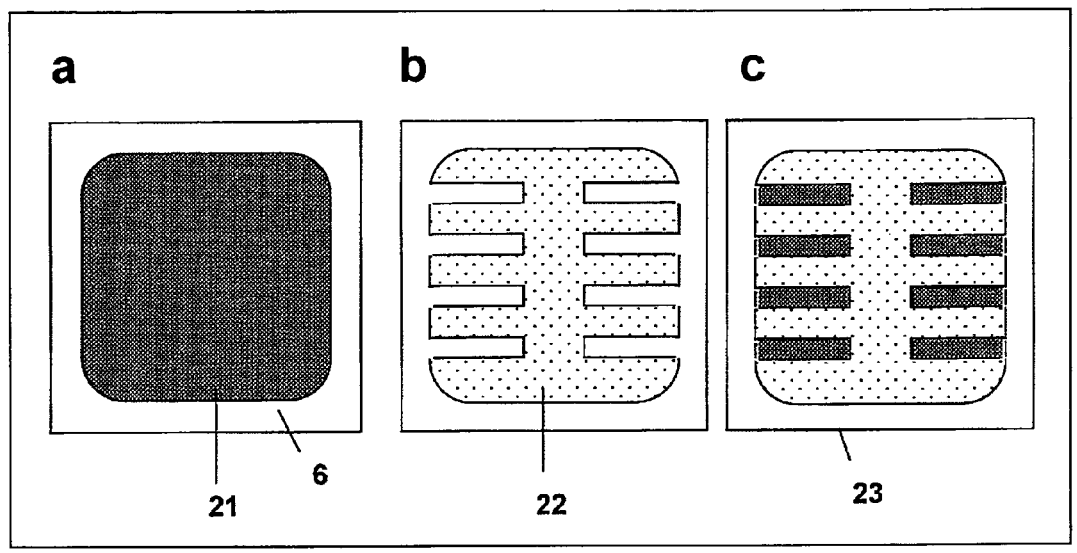
FIGS. 15a to 15c are schematic diagrams of the pixel 22 (FIG. 15b) and comb 21 (FIG. 15a) electrodes on the lower substrate 6 and an "equivalent solid electrode region" 23 (FIG. 5c) of a still further embodiment of the device.

In a still further embodiment, depicted in FIGS. 15*a* to 15*c*, the location of the pixel and comb electrodes is reversed, such that the comb electrode 21 (FIG. 15*a*) is patterned directly on the lower substrate 6, the insulating layer 16 is deposited onto this, and then the pixel electrode 22 (FIG. 15*b*) is deposited and patterned on the insulating layer 16. In this embodiment, the pixel electrode has line gaps or "substantially parallel elongate cut-outs" in it which determine the azimuthal orientation of the LC when subjected to an out-of-plane field, in the manner of that described in SID '07 Digest pp 756-759. As the area of electrode material in the pixel electrode region is substantially larger than the area of the gaps within the pixel electrode 22, it is still the out-of-plane electric field resulting from the voltage between the pixel 22 and counter 8 electrodes which determines the transmission of light through the pixel.

The comb electrode can either have fingers which align with the gaps in the pixel electrode, or can be uniformly solid in the shape of the pixel electrode but without the gaps. In the public mode, the voltages on the pixel 22 and comb 21 electrodes are set to optimise the uniformity of the out-of-plane field over the area of the pixel electrode, including the regions over the gaps in the pixel electrode. As in the first embodiment, in the situation of insignificant dielectric loss across the insulating layer, these voltages will be substantially the same. As the combination of pixel 22 and comb 21 electrodes appears to form a solid electrode region 23 (FIG. 15*c*), the azimuthal orientation of the LC is then determined by the influence of the fringe field at the edge of the pixel electrode and any protrusions in the domain region. In preferred embodiments, this will result in a CPA domain arrangement or MVA arrangement with associated wide viewing angle property.

In the private mode, the voltage on the comb electrode is altered such that a significant fringe field occurs in the gaps in the pixel electrode. The influence of these on the azimuthal orientation of the LC director then overrides that of the protrusions and edge fringe field of the pixel electrode and the LC director adopts a different configuration, such as a two domain VAN.

As with the previous embodiments, this two domain VAN state can be oriented at 45° to the transmission axis of the display polariser. A bias voltage between the two domains then results in an asymmetric viewing angle property which can be patterned to produce the privacy effect.

Figure 16:
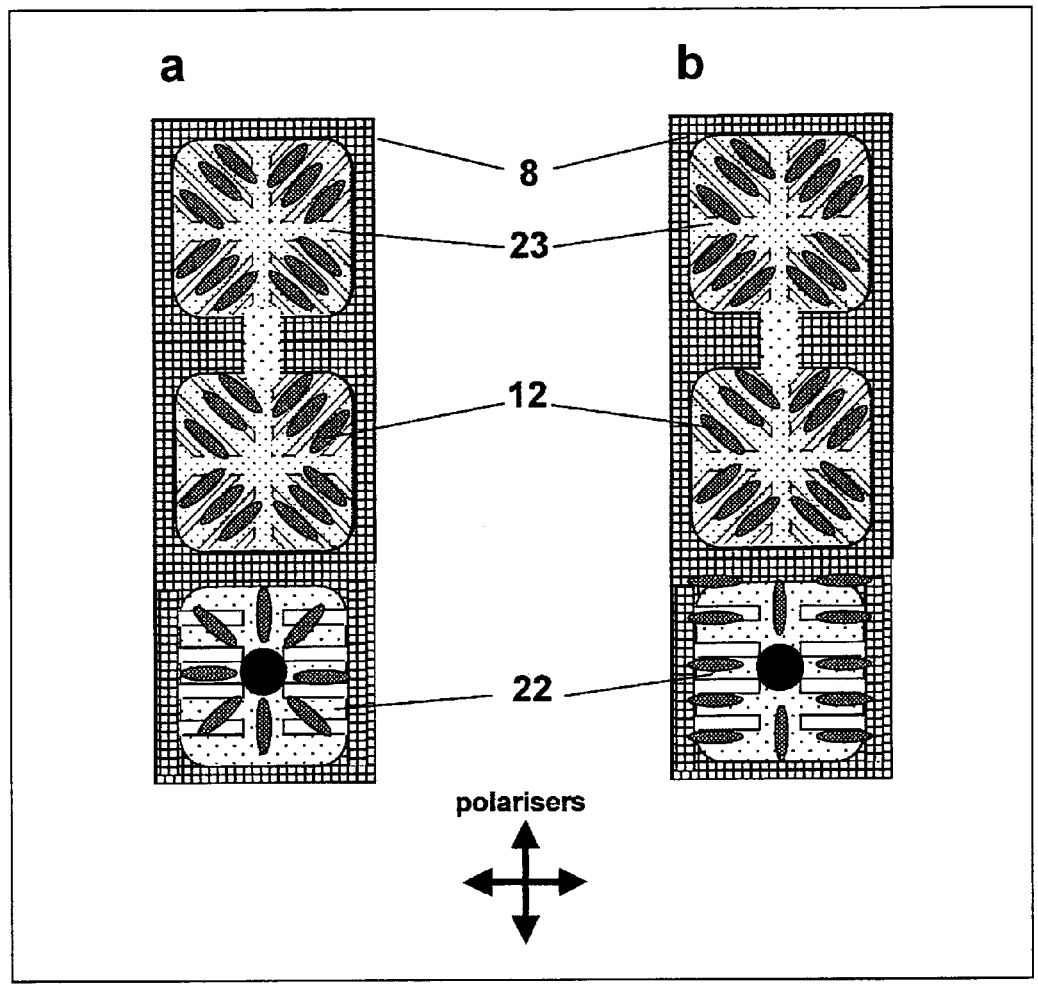
FIGS. 16a and 16b are schematic diagrams of a sub-pixel region of a still further embodiment, in which the regions of the display which transmit light to all viewers in both the public (FIG. 16a) and private (FIG. 16b) modes are an MVA type configuration.

The two-domain VAN state can also be arranged to be oriented parallel to the transmission axis of the display polariser in order to transmit light only to the side viewers 4, and create a loss of image contrast for these viewers and associated privacy effect as previously described. FIGS. 16*a* and 16*b* show schematic diagrams of a sub-pixel region of a display operating in this latter configuration, in the public (FIG. 16*a*) and private (FIG. 16*b*) modes. The regions of the display which transmit light to all viewers are shown operating in a PSA or MVA type mode in which the angled gaps in the pixel electrode 23 cause the LC director 12 to form four domains of orthogonal azimuthal orientation under the influence of the out-of-plane field. The regions of the display which are switchable between transmitting light to all viewers and transmitting light only to the side viewers are switched between a CPA configuration and a two-domain VAN configuration. The pixel regions in FIG. 16 are arranged as groups constituting pixels in the same way as in FIG. 14 except that the pixel regions without the comb electrode have a multiple domain vertical alignment.

In a still further embodiment, the pixel electrode 9 is again left without a central split and can be located either above or below the comb electrode. In this mode, the LC director has its azimuthal orientation controlled by the voltage between the pixel and comb electrodes as previously in order to switch from the public to private modes, but rather than apply a bias voltage between different regions of the pixel electrode, or align the two domain VAN regions in the private mode so as only to transmit light to the side viewers in order to enhance the privacy effect, the device is used in conjunction with a software adaptation, such as that described in US20040207594 to strengthen the privacy.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A liquid crystal device comprising an active matrix substrate and a counter-substrate having facing homeotropic alignment surfaces, between which is disposed a layer of nematic liquid crystal material, and carrying a pixel electrode arrangement and a counter-electrode arrangement, respectively, defining a plurality of pixel regions, each of at least some of which has a pixel electrode and a counter-electrode, arranged to apply a first electric field for controlling a liquid crystal director out-of-plane tilt angle, and a further electrode electrically insulated from the pixel and counter-electrodes and arranged to cooperate with at least one thereof to apply a second electric field for controlling the director in-plane azimuth angle;

wherein the first electric field is substantially uniform within the area of the pixel electrode and oriented perpendicular to the substrate surfaces, and the second electric field in at least one state preserves the uniformity and direction of the first electric field, and in at least one other state disrupts the first electric field creating non-uniformities with some component parallel to the substrate surface, thereby controlling the director in-plane azimuth angle.

2. A device as claimed in claim 1, in which the liquid crystal material is of negative dielectric anisotropy.

3. A device as claimed in claim 1, in which the first field substantially determines the on-axis electro-optic effect of the liquid crystal material of each of the at least some regions.

4. A device as claimed in claim 3, in which the on-axis electro-optic effect is substantially independent of the second field.

5. A device as claimed in claim 4, in which the second field substantially determines the angular variation of the electro-optic effect.

6. A device as claimed in claim 1, in which the first field is substantially perpendicular to the alignment surfaces.

7. A device as claimed in claim 1, in which the second field is substantially parallel to the alignment surfaces.

8. A device as claimed in claim 1, in which the layer is arranged to provide a retardation of half a wavelength for visible light at a finite value of the first field.

9. A device as claimed in claim 1, in which the further electrodes are disposed in a first layer separated from a second layer containing the pixel electrodes or the counter electrodes by a continuous electrically insulating third layer.

10. A device as claimed in claim 1, in which the pixel electrode of each of the at least some pixel regions is divided into first and second halves separated by a gap.

11. A device as claimed in claim 10, in which each of the at least some regions is arranged to operate in a two domain vertically aligned nematic mode for a second value of the second field, each further electrode of the at least some regions comprises a plurality of parallel finger portions, and each further electrode is disposed on the active-matrix substrate and has a portion which covers the gap.

12. A device as claimed in claim 11, in which each of the halves is divided into inner and outer portions.

13. A device as claimed in claim 11, in which the fingers of each further electrode extend substantially perpendicularly to the portion thereof.

14. A device as claimed in claim 10, in which each of the at least some pixel regions is arranged to have a multidomain liquid crystal structure in at least one operative state, and the at least some pixel regions are arranged as third and fourth interlaced sets with the first electrode halves of the third set being arranged to receive a first bias voltage having a first polarity with respect to the second electrode halves of the third set and with the first electrode halves of the fourth set being arranged to receive a second bias voltage having a second polarity opposite the first polarity with respect to the second electrode halves of the fourth set.

15. A device as claimed in claim 14, in which the third and fourth sets are sufficiently large for the interlacing to be visible to a human viewer of the device.

16. A device as claimed in claim 1, in which each of the at least some pixel regions is arranged to have a multidomain liquid crystal structure in at least one operative state.

17. A device as claimed in claim 16, in which the multidomain structure at least covers the pixel electrode.

18. A device as claimed in claim 16, in which the active matrix substrate and the counter-substrate are disposed between first and second linear polarisers whose transmission axes are perpendicular to each other, and the transmission axes of the first and second polarisers are oriented substantially parallel or perpendicular to the finger portions.

19. A device as claimed claim 1, in which each of the at least some regions is arranged to have a continuous pinwheel alignment for a first value of the second field.

20. A device as claimed in claim 1, in which each of the at least some regions is arranged to operate in a two domain vertically aligned nematic mode for a second value of the second field.

21. A device as claimed in claim 20, in which each further electrode of the at least some regions comprises a plurality of parallel finger portions.

22. A device as claimed in claim 21, in which each counter-electrode of the at least some regions is divided into first and second halves separated by a gap and each further electrode is disposed on the counter-substrate and has a portion which covers the gap.

23. A device as claimed in claim 21, in which the finger portions of all of the further electrodes are substantially parallel.

24. A device as claimed in claim 21, in which the at least some regions are arranged as interlaced first and second sets with the further electrode finger portions of the second set being substantially perpendicular to the further electrode finger portions of the first set.

25. A device as claimed in claim 21, in which the active matrix substrate and the counter-substrate are disposed between first and second linear polarisers whose transmission axes are perpendicular to each other, and the transmission axes of the first and second polarisers are oriented substantially at 45° to the finger portions.

26. A device as claimed in claim 20, in which each pixel electrode of the at least some regions has a plurality of substantially parallel elongate cut-outs.

27. A device as claimed in claim 26, in which each further electrode of the at least some regions has portions disposed behind the cut-outs.

28. A device as claimed in claim 1, in which the pixel regions are arranged as groups of adjacent regions with each group constituting a pixel and having at least one of the at least some pixel regions.

29. A device as claimed in claim 28, in which each group comprises at least one other pixel without a further electrode.

30. A device as claimed in claim 29, in which each at least one other pixel region has a continuous pinwheel alignment.

31. A device as claimed in claim 29, in which each at least one other pixel region has a multiple domain vertical alignment.

32. A device as claimed in claim 28, in which the pixel electrode of each of the at least some pixel regions is divided into first and second halves separated by a gap,
- the at least some pixel regions are arranged as third and fourth interlaced sets with the first electrode halves of the third set being arranged to receive a first bias voltage having a first polarity with respect to the second electrode halves of the third set and with the first electrode halves of the fourth set being arranged to receive a second bias voltage having a second polarity opposite the first polarity with respect to the second electrode halves of the fourth set, and
- each of the third and fourth sets comprises a single pixel and the pixels are arranged to display spatially interlaced first and second images.

33. A device as claimed in claim 1, in which the active matrix substrate and the counter-substrate are disposed between first and second linear polarisers whose transmission axes are perpendicular to each other.

* * * * *